(12) United States Patent
Lane et al.

(10) Patent No.: US 7,677,815 B2
(45) Date of Patent: Mar. 16, 2010

(54) PHOTOGRAPHIC DEVICE WITH RETRACTABLE LENS

(75) Inventors: David M. Lane, Sammamish, WA (US); Gino Garcia, Edmunds, WA (US); Young Kim, Bellevue, WA (US); Eric J. Wahl, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 465 days.

(21) Appl. No.: 11/545,148

(22) Filed: Oct. 10, 2006

(65) Prior Publication Data

US 2008/0085112 A1 Apr. 10, 2008

(51) Int. Cl.
G03B 17/04 (2006.01)
G03B 17/02 (2006.01)
H04N 5/225 (2006.01)

(52) U.S. Cl. .................. 396/348; 396/535; 348/373; 348/376

(58) Field of Classification Search ......... 396/349, 396/419, 429, 535, 348, 350; 348/373–376, 348/14.1; 248/226.11
See application file for complete search history.

(56) References Cited

U.S. PATENT DOCUMENTS

| | | | | |
|---|---|---|---|---|
| 4,019,192 | A | 4/1977 | Miyagawa | 354/187 |
| 4,112,277 | A * | 9/1978 | Kleeb | 200/524 |
| 4,410,253 | A | 10/1983 | Tsuboi | 354/195 |
| 5,258,790 | A | 11/1993 | Tanaka | 354/94 |
| 5,664,240 | A | 9/1997 | Arita et al. | 396/137 |
| 6,256,063 | B1 | 7/2001 | Saito et al. | 348/231 |
| 6,496,361 | B2 * | 12/2002 | Kim et al. | 361/683 |
| 6,715,938 | B2 | 4/2004 | Takanashi | 396/349 |
| 6,812,958 | B1 * | 11/2004 | Silvester | 348/207.1 |

2001/0033747 A1 10/2001 Enderby (Continued)

FOREIGN PATENT DOCUMENTS

GB 2416036 A1 1/2006

(Continued)

OTHER PUBLICATIONS

Written Opinion of the International Searching Authority for Application No. PCT/US2007/078630.

(Continued)

*Primary Examiner*—W. B. Perkey
*Assistant Examiner*—Minh Q Phan
(74) *Attorney, Agent, or Firm*—Alan G. Rego; Westman Champlin & Kelly P.A.

(57) ABSTRACT

A photographic device that includes a main body, a lens barrel and a barrel-positioning mechanism, which is operably coupled to the lens barrel and the main body. The barrel positioning mechanism is capable of moving the lens barrel between a retracted position, in which the lens barrel is within the main body, and an extended position, in which the lens barrel projects out of the main body. In some embodiments, the barrel positioning mechanism is a purely mechanical component that moves the lens barrel between the retracted position and the extended position in response to the lens barrel being pushed in a direction generally towards the main body. In other embodiments, the barrel positioning mechanism includes an electrical motor that helps extend and retract the lens barrel. In some embodiments, the extension/retraction of the lens barrel is triggered by software.

17 Claims, 7 Drawing Sheets

U.S. PATENT DOCUMENTS

| | | | |
|---|---|---|---|
| 2002/0154243 A1 | 10/2002 | Fife et al. | 348/372 |
| 2003/0174229 A1 | 9/2003 | Kubota | 348/335 |
| 2005/0162545 A1* | 7/2005 | Jeon | 348/373 |
| 2005/0220451 A1* | 10/2005 | Cho et al. | 396/349 |
| 2006/0166712 A1 | 7/2006 | Wu | 455/575.1 |
| 2007/0001087 A1* | 1/2007 | Shyu et al. | 248/688 |
| 2008/0099636 A1 | 5/2008 | Depay et al. | |

FOREIGN PATENT DOCUMENTS

| | | |
|---|---|---|
| KR | 20-1998-0021871 | 7/1998 |
| KR | 10-1999-0024567 | 4/1999 |
| KR | 10-2003-0073515 | 9/2003 |
| WO | WO 2004/054229 A1 | 6/2004 |

OTHER PUBLICATIONS

International Search Report for Application No. PCT/US2007/078630.

"Sony Handycam Buying Guide 2004, MICROMV," http://www.amazon.co.uk/exec/obidos/tg/feature/-/533613/202-7001285-1971052, 2004, pp. 1-12.

"The Imaging Resource, Quick Review Minolta DiMAGE Xt Digital Camera," http://imaging-resource.com/PRODS/XT/XTA.HTM, Aug. 2006, pp. 1-17.

* cited by examiner

PHOTOGRAPHIC DEVICE WITH RETRACTABLE LENS

BACKGROUND

In general, a photographic lens, which typically projects from a main body of a photographic device (still camera, webcam or other audio-video device), needs to be protected from being soiled or damaged by hitting other objects when the photographic device is taken from one place to another or put to use. Webcams designed for the laptop/notebook personal computer (PC) space have special design considerations, one of which is the need for an easily operable mechanism for protecting the photographic lens when not in use. Because such webcams are often placed in a travel or computer bag, the lens is highly susceptible to scratching.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

A photographic device that includes a main body and a retractable lens barrel is provided. Also included, in the photographic device, is a barrel-positioning mechanism, operably coupled to the lens barrel and the main body. The barrel positioning mechanism is capable of moving the lens barrel between a retracted position, in which the lens barrel is within the main body, and an extended position, in which the lens barrel projects out of the main body. In some embodiments, the barrel positioning mechanism is a purely mechanical component that moves the lens barrel between the retracted position and the extended position in response to the lens barrel being pushed in a direction generally towards the main body. In other embodiments, the barrel positioning mechanism includes an electrical motor that helps extend and retract the lens barrel. In some embodiments, the extension/retraction of the lens barrel is triggered by software.

DETAILED DESCRIPTION

Figure 1:
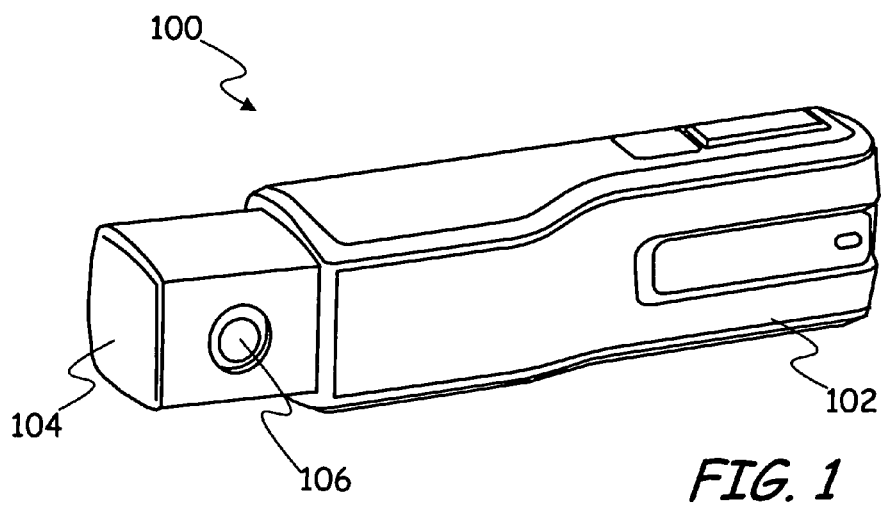
FIG. 1 is simplified block diagram of a photographic device in accordance one of the present embodiments.

FIG. 1 is a very simplified block diagram of a photographic device 100 in accordance with one of the present embodiments. Photographic device 100 includes a main body 102 and a lens barrel 104 that has a photographic lens 106. As can be seen in FIG. 1, lens barrel 104 is positioned such that it extends substantially outside main body 102. In this position, photographic device 100 is capable of taking pictures. In accordance with the present embodiments, lens barrel 104 is moveable between the extended position, shown in FIG. 1, and a retracted position, in which lens barrel 104 is within main body 102. In the retracted position, photographic lens 106 is protected from being soiled or damaged by hitting other objects. The present embodiments primarily relate to mechanisms, described in detail further below, for extending and retracting lens barrel 104. It should be noted that photographic device 100 may be a webcam (video camera, usually attached directly to a computer, whose current or latest images are typically requestable from Web sites) or any type of still camera or audio-video device having components similar to those shown in FIG. 1. However, example embodiments described below primarily relate to lens barrel positioning mechanisms for webcams.

Figure 2A:
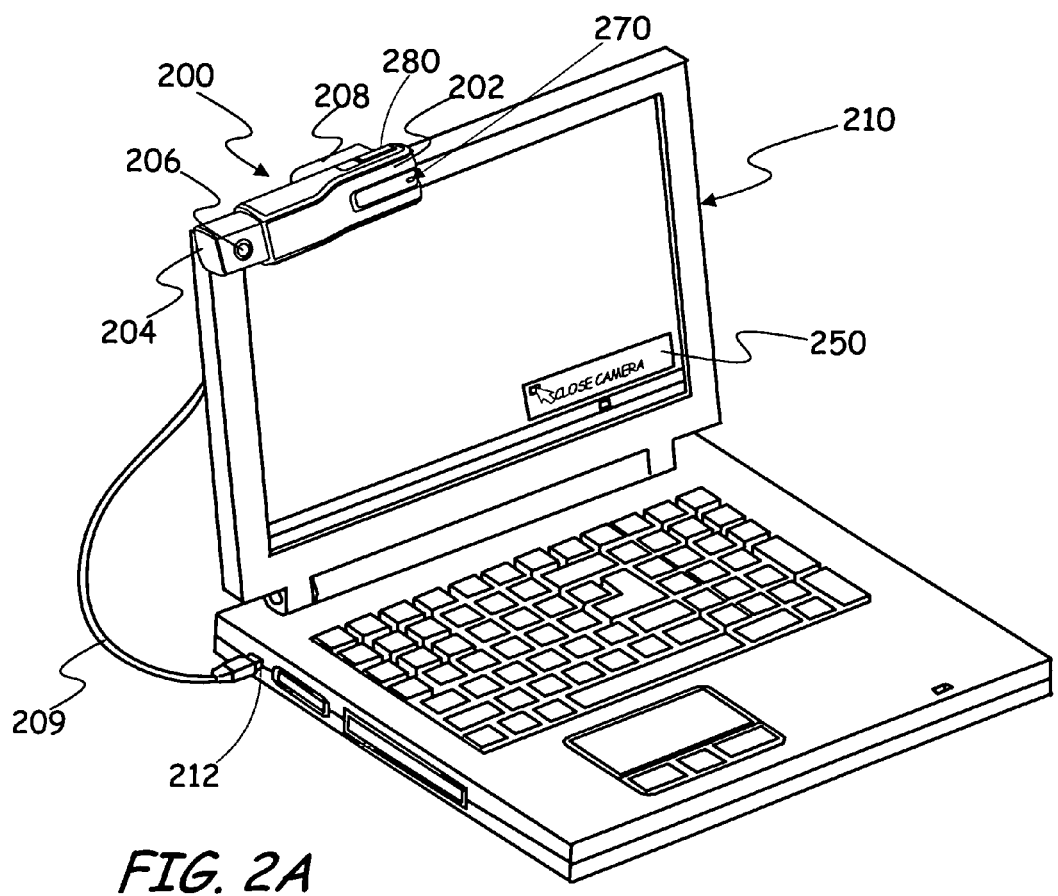
FIGS. 2A and 2B are simplified block diagrams that illustrate laptop computers with attached webcams in accordance with some of the present embodiments.
Figure 2B:
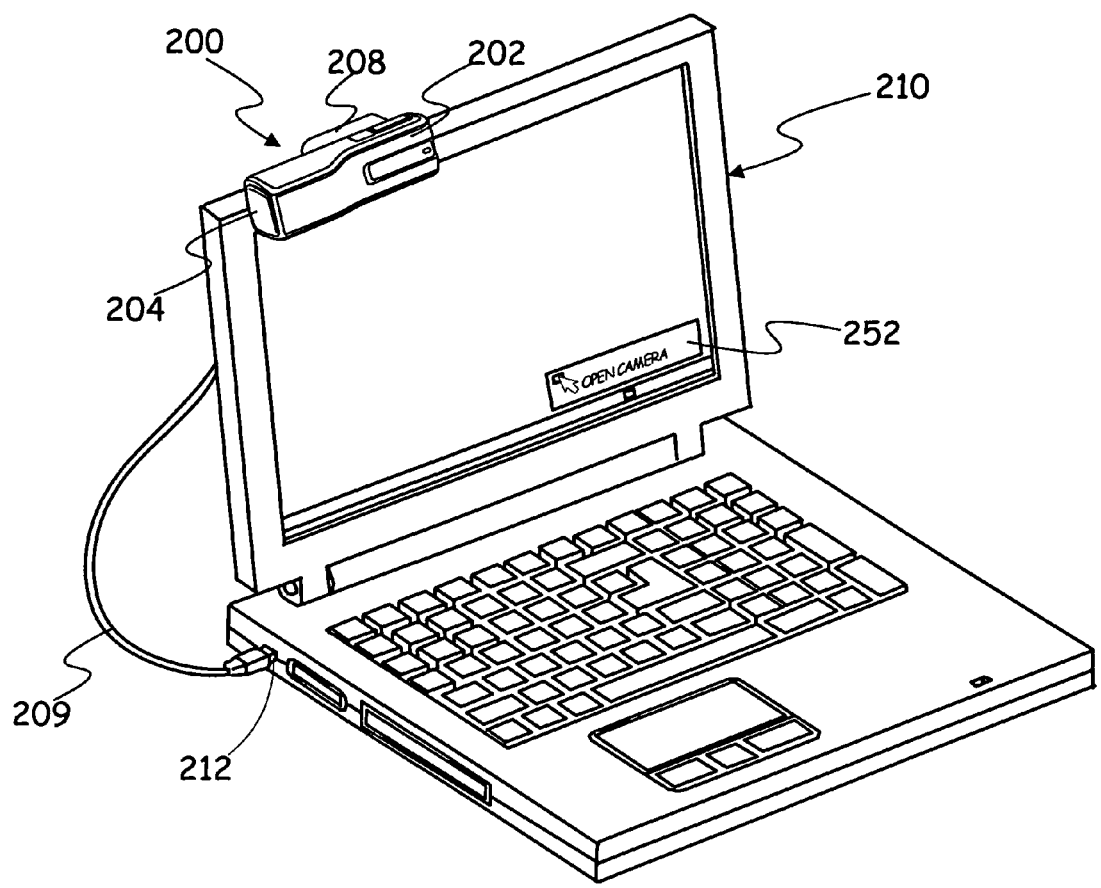

FIGS. 2A and 2B illustrate laptop computers 210 with attached webcams 200 in accordance with the present embodiments. FIG. 2A illustrates webcam 200 with lens barrel 204 in an extend position, outside main body 202, with lens 206 in a picture taking position. In FIG. 2B, lens barrel 204 is in a retracted position within main body 202. In other respects, FIGS. 2A and 2B are identical.

As can be seen in FIGS. 2A and 2B, webcam 200 is attached to laptop 210 with the help of an attachment feature (a webcam clip, for example) 208. In the embodiment shown in FIGS. 2A and 2B, webcam 200 is communicatively coupled to a Universal Serial Bus (USB) port 212 of laptop 210 with the help of a cable 209. During normal operation, webcam 200 receives its main power supply from laptop 210 via USB port 212. Of course, webcam 200 may be communicatively coupled to laptop computer 210 in any other suitable wired or wireless manner currently known or that will be developed in future. Also, any other suitable method for providing the main power supply to webcam 200 may be used. Discussed in detail below are different mechanisms for moving lens barrel 204 between the extended position (FIG. 2A) and the retracted position (FIG. 2B).

Figure 3:
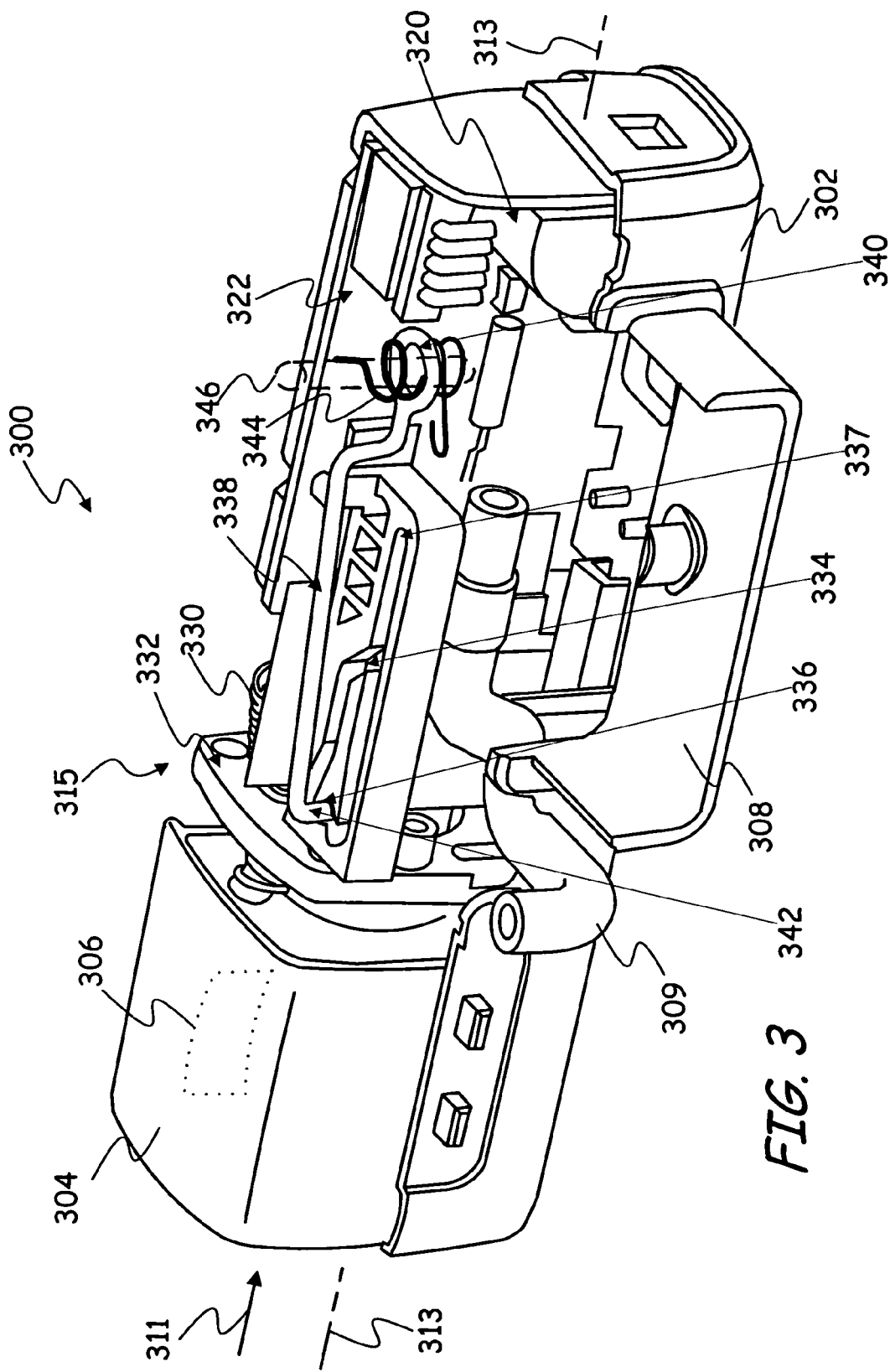
FIG. 3 is a diagrammatic illustration of a webcam showing details of one of the present embodiments.

FIG. 3 is a diagrammatic illustration of a webcam 300 showing details of one of the present embodiments. The view shown in FIG. 3 is from the rear of webcam 300, with webcam 300 also shown flipped upside down. The front of webcam 300, which includes lens 306, is hidden.

FIG. 3 shows a top portion of a main body 302, a lens barrel 304 and details of a barrel positioning mechanism 315. Mechanism 315 is capable of moving lens barrel 304 between its retracted position, shown in FIG. 3, and an extended position, in response to lens barrel 304 being pushed in a direction (311) generally towards main body 302 and generally along a longitudinal axis 313 of main body 302. Also shown in FIG. 3 are webcam clip 308, a cable tube 309, a microphone 320 and a printed circuit board with electrical components denoted by reference numeral 322.

Figure 4:
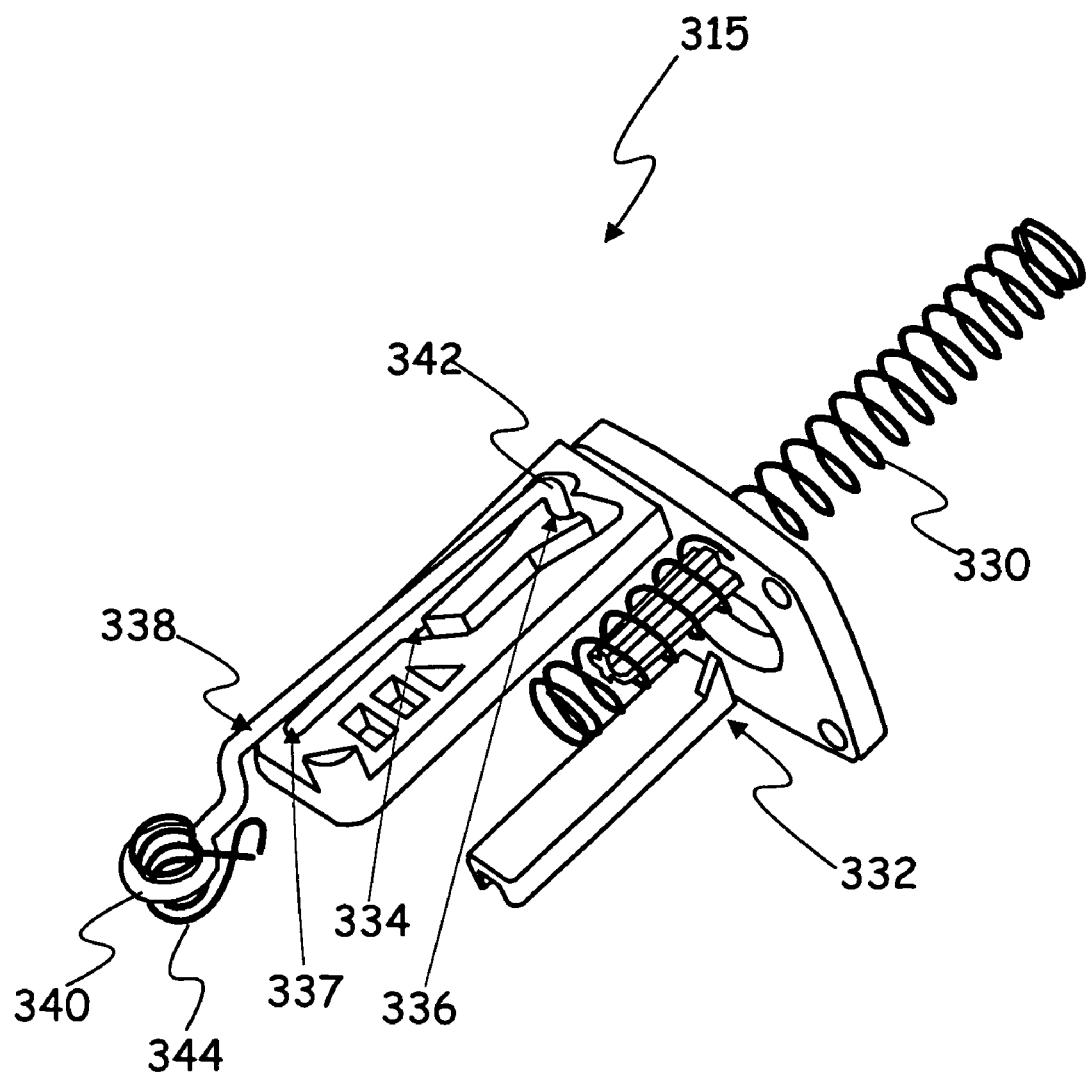
FIG. 4 is a diagrammatic illustration showing details of a barrel positioning mechanism in accordance with one of the present embodiments.

It should be noted that barrel positioning mechanism 315 (of FIG. 3), which is shown independently in FIG. 4, is a purely mechanical component that needs no electrical power for its operation. Barrel positioning mechanism 315 includes a main spring 330 that powers the mechanism 315. Main spring 330 provides constant tension on the mechanism, so that a user does not have to pull the barrel out, only push it against the spring 330. Also included in barrel positioning mechanism 315 is a carrier portion 332, which couples to lens barrel 304 and supports main spring 330. Carrier portion 332 can be made of any suitable material (any suitable plastic, for example). In some embodiments, lens barrel 304 is rotatably coupled to carrier portion 332. As can be seen in FIGS. 3 and 4, carrier portion 332 includes a guide channel 334 and a retention feature 336. A spring follower 338 moves within guide channel 334. In the example embodiment shown in FIGS. 3 and 4, spring follower 338 is a bent rod, made of steel or any other suitable metal, having a first end 340 and a second end 342. Spring follow 338 is held in position with the help of a biasing spring 344 and a protruding feature 346 that extends from main body 302 and fits into its first end 340. It is should be noted that, due to the absence of the bottom portion of main body 302 in the view of webcam 300 shown in FIG. 3, a connection between protruding feature 346 and main body 302 is not shown. Second end 342 of spring follower 338 is configured to move within guide channel 334. As can be seen in FIGS. 3 and 4, guide channel 334 has features such as detents and ramp zones such that when a user pushes lens barrel 304 in, spring follower 338 will fall into retention feature 336, and hold lens barrel 304 in main body 302. When the user pushes lens barrel 304 in again, spring follower 338 follows the same guide channel 334 to another location (such as channel end location 337), letting lens barrel 304 slide out and stay in the extended position. Thus, as mentioned above, due to constant tension provided by main spring 330, a user does not have to pull the lens barrel out, only push in against the spring 330. As noted earlier, webcam 300 also includes a microphone 320, which is within main body 302. Microphone 320 can be a directional microphone that captures sound waves through a groove (such as groove 270 shown in FIG. 2A) in main body 302. In summary, FIGS. 3 and 4 show a relatively simple embodiment of a barrel positioning mechanism, which includes only mechanical components and therefore operates independently of any external or internal power source of webcam 300.

Figure 5:
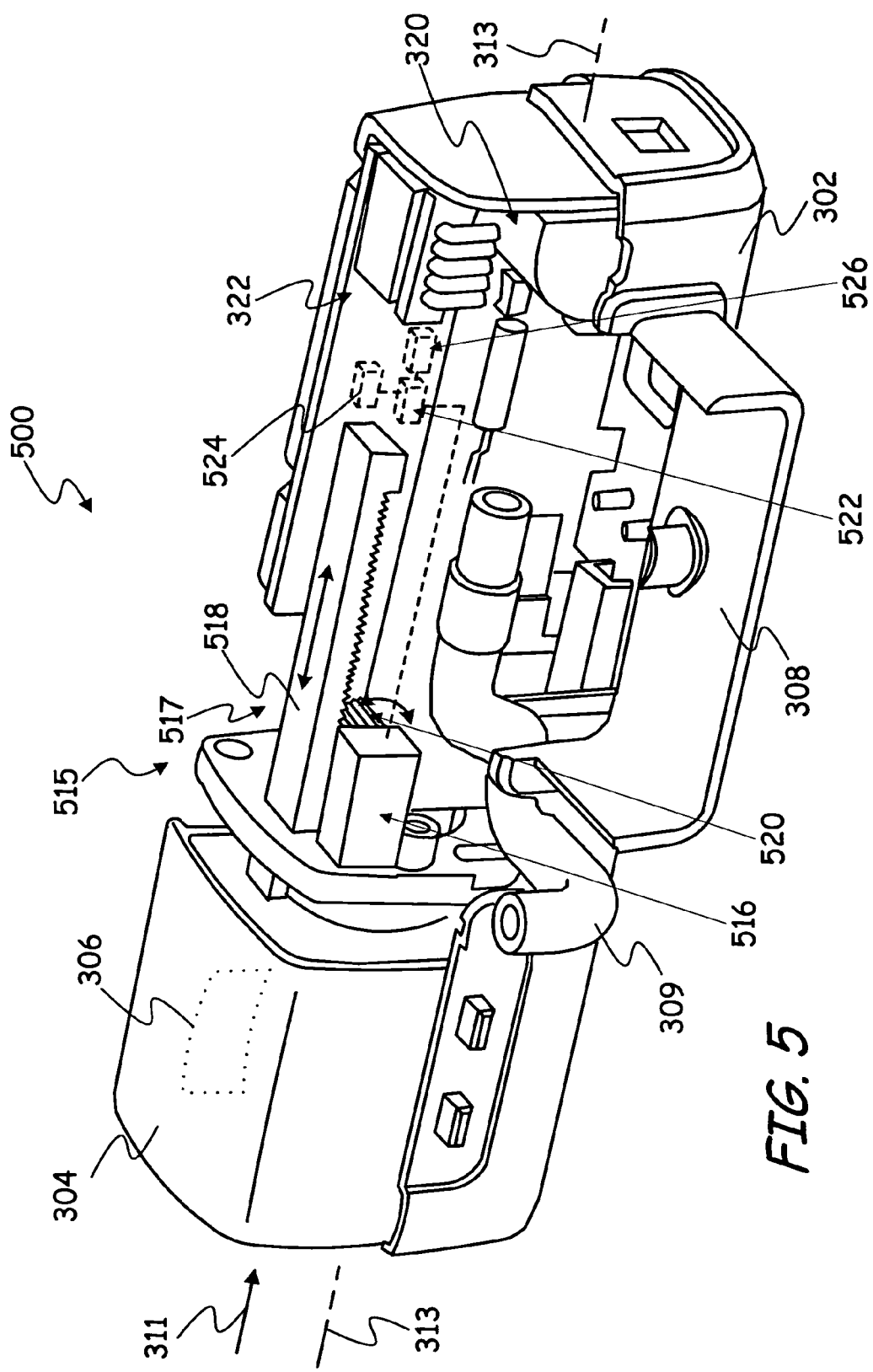
FIG. 5 is a diagrammatic illustration of a webcam showing details of another one of the present embodiments.

FIG. 5 is a diagrammatic illustration of a webcam 500 showing details of another one of the present embodiments. Other than barrel positioning mechanism 515 of webcam 500 (shown in FIG. 5) being different from barrel positioning system 315 of webcam 300 (shown in FIGS. 3 and 4), the remaining components of webcams 500 and 300 are substantially similar and are therefore numbered with the same reference numerals. In contrast with barrel positioning mechanism 315 of FIG. 3, which includes only mechanical components, barrel positioning mechanism 515 of FIG. 5 is an electrically operated component which can be driven by an electric motor 516, for example. Electrical motor 516 is operably coupled to a rotary to linear motion converter 517. In some such embodiments, when a user pushes a button (such as button 280 shown in FIG. 2A) on the outside of the camera, electric motor 516 turns and either pulls lens barrel 304 into main body 302, or pushes it out of the body.

The example rotary to linear motion converter shown in FIG. 5 is a rack and pinion arrangement (rack 518 and pinion 520) coupled to electric motor 516 and to lens barrel 304. However, instead of a rack and pinion arrangement being employed, electric motor 516 can be coupled to lens barrel 304 with a series of gear reductions and/or a lead screw mechanism. Piezoelectric actuators or other suitable mechanisms may also be used instead of the above configurations.

Some of the present embodiments are configured such that, when a user unplugs webcam 500 and forgets to pull lens barrel 304 back into the main body 302, an onboard reserve power system 526 in webcam 500 is utilized to automatically retract lens barrel 304. Onboard reserve power system 526 can be a bank of capacitors, a supercapacitor (an electrochemical capacitor that has an unusually large amount of energy storage capacity relative to its size when compared with conventional capacitors) or at least one small battery that would provide enough power to retract lens barrel 304. A microprocessor 522 and a memory 524, which stores instructions that the microprocessor is configured to execute, are useful for implementing the automatic retraction of lens barrel 304.

Figure 6:
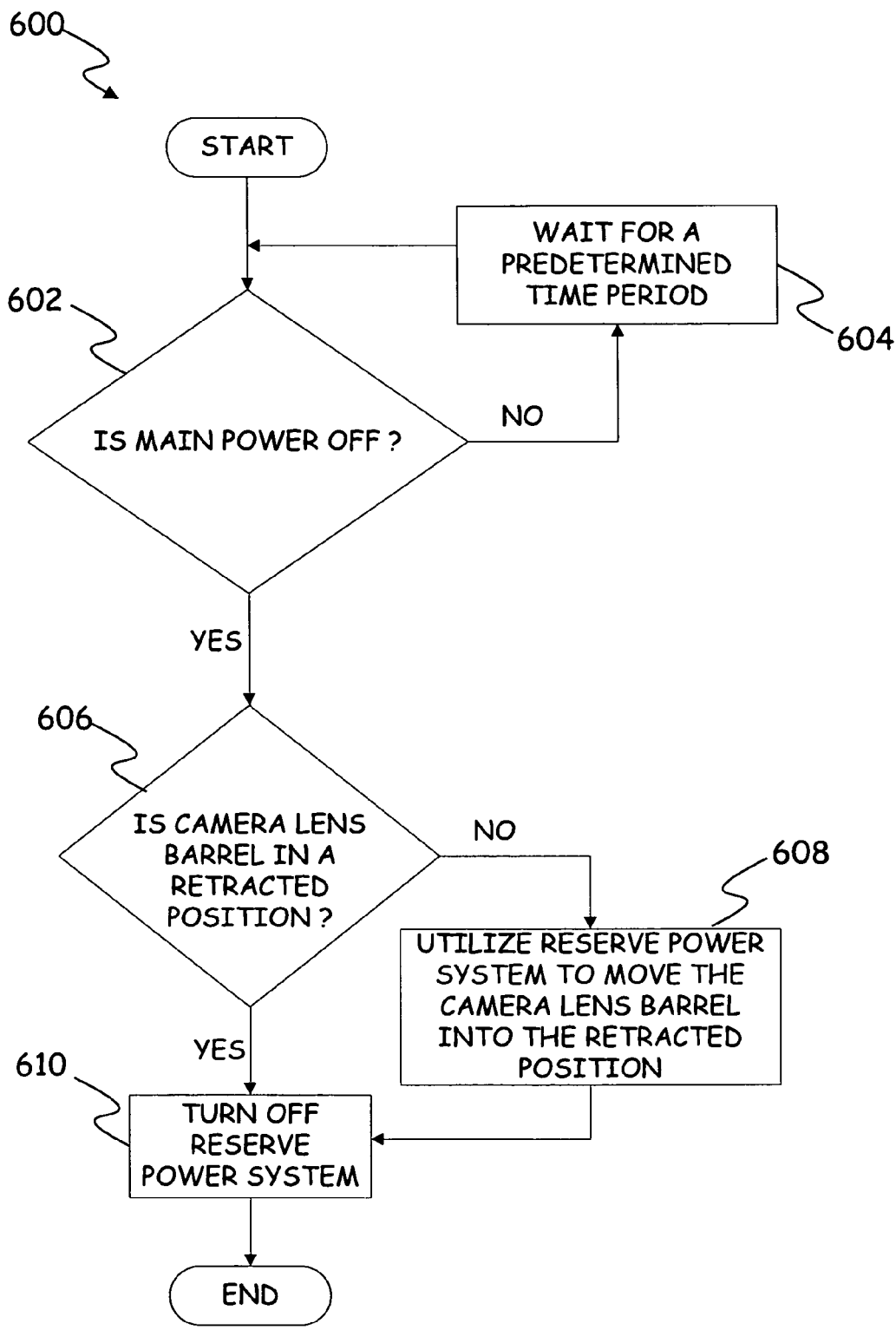
FIG. 6 is a flowchart of an automatic lens retraction process in accordance with one of the present embodiments.

FIG. 6 is a flowchart 600 of an automatic lens retraction process in accordance with one of the present embodiments. Steps 602 and 604 involve monitoring of a main power supply (received from a computer USB port, for example) of a webcam by periodically checking if the main power is on after short predetermined time intervals. If the main power supply is found to be off, at step 606, a determination is made as to whether the lens barrel is in a retracted position. If the lens barrel is not in a retracted position, in accordance step 608, the onboard reserve power system is utilized to move the lens barrel into the retraced position. Step 610 indicates that once the lens barrel is in a retracted position, the onboard reserve power system is turned off. As noted above, these steps are carried out under the control of microprocessor 522 based on instructions stored in memory 524.

In some of the present embodiments, this extension/retraction of lens barrel 304 is triggered by software. This provides a relatively easy method to give users privacy when they want to leave the webcam plugged in to a laptop, for example, but want to know, with relative certainty, that the webcam is not on. For example, FIG. 2A shows a feature that enables a user to point and click on an icon or button 250, that causes a lens barrel retraction command to be passed to the webcam, which responsively retracts of the lens barrel. FIG. 2B shows a similar icon or button 252 that can be clicked on to cause extension of the lens barrel. Additional program code stored in memory 524 (FIG. 5), and executable by microprocessor 522 (FIG. 5), helps interpret and execute extension/retraction commands sent from the computer to the webcam. Any suitable wired or wireless technique for communicating the commands from the computer to the webcam may be used.

Figure 7:
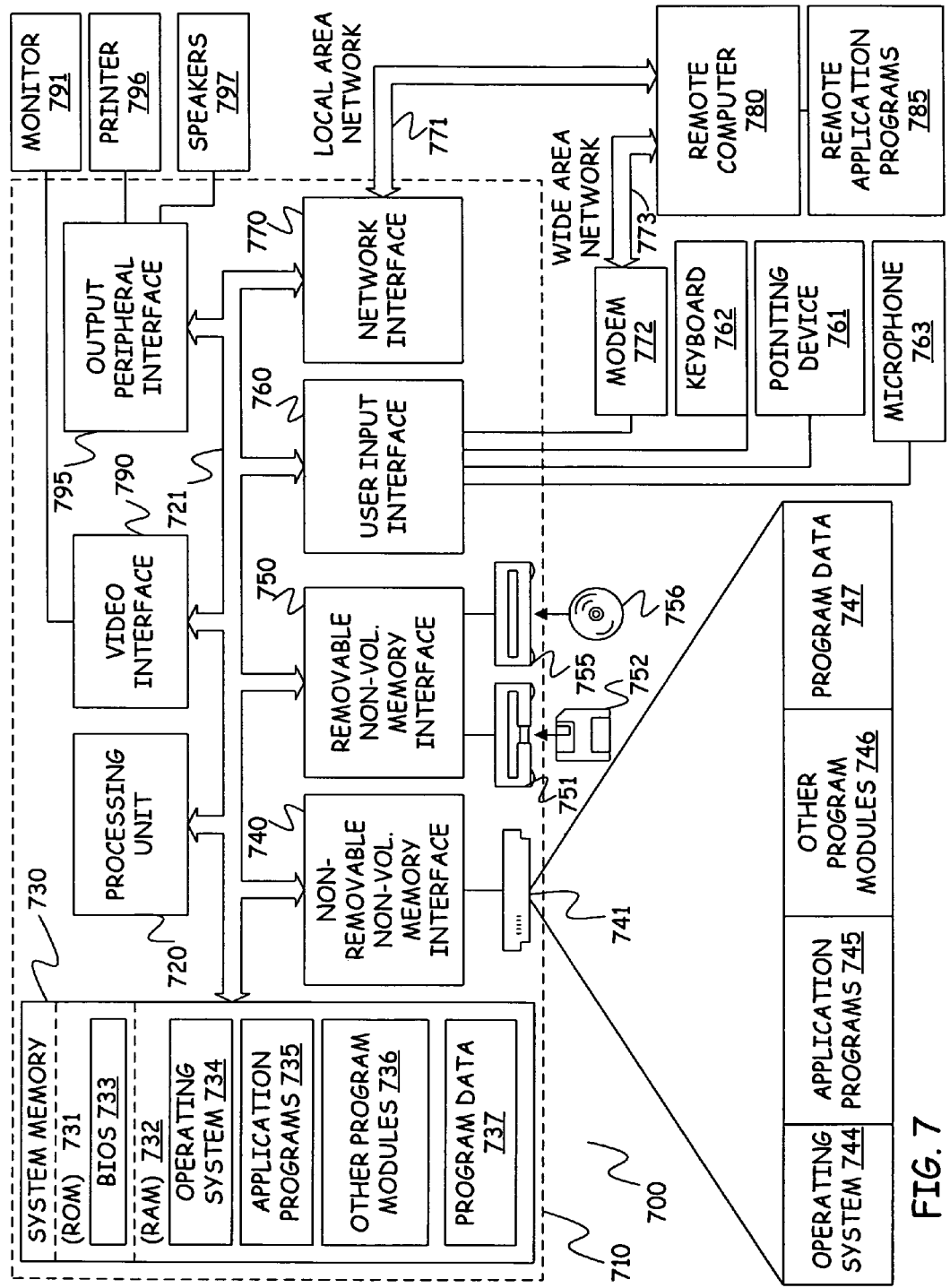
FIG. 7 is a block diagram of one illustrative general purpose computing device with which at least some of the present embodiments can be used.

FIG. 7 illustrates an example of a suitable computing system environment 700 with which embodiments may be implemented. One exemplary place for lens barrel extension/retraction software commands to fit into environment 700 is in program modules 746, which are described in general below. Lens barrel extension/retraction commands could fit into other places as well, of course. Also, the computing system environment 700 is only one example of a suitable computing environment and is not intended to suggest any limitation as to the scope of use or functionality of the claimed subject matter. Neither should the computing environment 700 be interpreted as having any dependency or requirement relating to any one or combination of components illustrated in the exemplary operating environment 700.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 7, an exemplary system for implementing some embodiments includes a general-purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies.

A user may enter commands and information into the computer 710 through input devices such as a keyboard 762, a microphone 763, and a pointing device 761, such as a mouse, trackball or touch pad. Other input devices (not shown) may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 is operated in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computer 710. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on remote computer 780. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Also, although most of the above lens barrel positioning embodiments are described in connection with webcams, the principles illustrated in these embodiments are applicable to any photographic device.

What is claimed is:

1. A photographic device comprising:
   a main body;
   a lens barrel; and
   a barrel-positioning mechanism, operably coupled to the lens barrel and the main body, configured to move the lens barrel between a retracted position, in which the lens barrel is within the main body, and an extended position, in which the lens barrel projects out of the main body, in response to the lens barrel being pushed in a direction generally towards the main body and generally along a longitudinal axis of the main body,
   wherein the photographic device that includes the main body, the lens barrel and the barrel-positioning mechanism is a stand-alone device that is communicably coupleable, via a communication link, and releasably mechanically attachable, by an attachment feature, to a computer.

2. The apparatus of claim 1 wherein the barrel-positioning mechanism comprises a main spring that powers the barrel-positioning mechanism.

3. The apparatus of claim 2 wherein the barrel positioning mechanism further comprises:
   a carrier portion having a guide channel and a retention feature; and
   a spring follower having a first end that couples to the main body and a second end that is configured to move within the guide channel alternately into and out of the of the retention feature, in response to the lens barrel being pushed in the direction generally towards the main body.

4. The apparatus of claim 3 wherein the first end of the spring follower is coupled to the main body with the help of a protruding feature that extends from the main body.

5. The apparatus of claim 4 wherein the spring follower is held in position with the help of a biasing spring.

6. The apparatus of claim 1 and further comprising a microphone.

7. The apparatus of claim 1 wherein the photographic device is a webcam.

8. The apparatus of claim 1 wherein the photographic device is a still camera.

9. The apparatus of claim 3 wherein the spring follower is a bent metal rod.

10. The apparatus of 4 wherein lens barrel is rotatably coupled to the carrier portion.

11. The apparatus of claim 5 wherein the first end of the spring follower comprises a loop that encircles the biasing spring.

12. A webcam comprising:
    a main body;
    a directional microphone;
    an attachment feature for attaching the webcam to a computer monitor;
    a lens barrel; and
    a barrel-positioning mechanism, operably coupled to the lens barrel and the main body, configured to move the lens barrel between a retracted position, in which the lens barrel is within the main body, and an extended position, in which the lens barrel projects out of the main body,
    wherein the webcam that includes the main body, the directional microphone, the attachment feature, the lens barrel and the barrel-positioning mechanism is a stand-alone device that is releasably mechanically attachable, by the attachment feature, to the computer monitor and communicably coupleable, via a communication link, to a computer that includes the computer monitor;
    wherein the barrel positioning mechanism is a purely mechanical component that moves the lens barrel between the extended position and the retracted position in response to the lens barrel being pushed in a direction generally toward the main body and generally along a longitudinal axis of the main body.

13. The apparatus of claim 12 wherein the barrel positioning mechanism is electrically operated component.

14. The apparatus of claim 13 wherein the barrel positioning mechanism comprises a rotary to linear motion converter.

15. The apparatus of claim 14 wherein the rotary to linear motion converter comprises one of a rack and pinion arrangement, a set of gear reductions and a lead screw mechanism.

16. The apparatus of claim 13 wherein the barrel positioning mechanism, upon disconnection of a main power supply to the webcam, is configured to utilize an onboard reserve power system to automatically retract the lens barrel.

17. The apparatus of claim 16 wherein the onboard reserve power system is one of a battery, a capacitor bank and a supercapacitor.

* * * * *